MARVIN H. BERNSTEIN
ABRAHAM SHULMAN
INVENTOR.

BY *A. Shulman*

United States Patent Office 3,191,169
Patented June 22, 1965

3,191,169
SYMBOL PRESENTATION MEANS FOR
RADAR DISPLAYS
Abraham Shulman, Queens Village, N.Y. (46 Farber Drive, Babylon, N.Y.), and Marvin H. Bernstein, Old Bethpage, N.Y.; said Bernstein assignor to said Shulman
Filed Nov. 29, 1960, Ser. No. 72,342
2 Claims. (Cl. 343—5)

This invention relates to an improved radar display system and particularly to the presentation of symbolic information at selected positions on the screen of a cathode ray tube.

In the application of cathode ray tubes to the presentation of radar PPI displays, it is often desirable to provide means for displaying symbolic information on the screen adjacent to the radar targets. The symbolic information may include alphabetic and numerical characters, and may provide to the radar operator ready means for identifying the target and its characteristics. When many radar targets appear simultaneously on the screen, as is often the case, it is desirable that the symbolic information be presented in close proximity to the radar target associated therewith, in order to avoid confusion with those neighboring. Consequently it is desirable that the symbolic information be compressed into a relatively small area immediately adjacent to the associated target, and that it follow the target if there is motion.

An article by the present inventors in the December 1959 issue of "Space-Aeronautics" entitled "Target-Plus-Symbol Display Simplifies ATC Radar Tracking," describes a test system embodying the principles of this invention. The system comprises a track-while-scan radar system in combination with symbolic information generating and display equipment. The system was constructed and operated solely to test its value in the control of air traffic. The symbolic information was associated with the radar targets on the PPI screen. The symbols were employed to furnish identity and other pertinent operational information concerning the aircraft. The track-while-scan feature and the symbolic identification of targets were found to be of value in improving air traffic control, particularly under heavy traffic conditions.

Accordingly an important object of this invention is to provide improved air traffic control, particularly under heavy traffic conditions.

Another object is to identify or codify the radar targets on a radar display.

A still further object is to present symbolic information, including alphabetical and numerical characters, in close proximity to an associated radar target on a radar display.

It is known that scan-conversion to television offers certain advantages over a direct PPI display in the presentation of radar data. In particular scan-converted displays are brighter, target intensity is more constant, and persistence is improved. On the other hand the direct PPI display retains important advantages; particularly accuracy relative to tracking tags and overlays. Accuracy is degraded in scan-conversion owing to the difficulty of converting tags and symbols, which must usually therefore be added by separate means. It is a unique feature of the present invention that the advantages of both methods of display are retained by combining scan-converted displays and direct PPI displays in the same system, operating simultaneously in synchronism with a common symbol-generating system.

Accordingly another important object of this invention is to combine direct PPI displays, and scan-converted displays with comon symbol generation and with a radar tracking system.

Other objects of the invention will be apparent from the following description and accompanying drawings in which.

Figure 1:
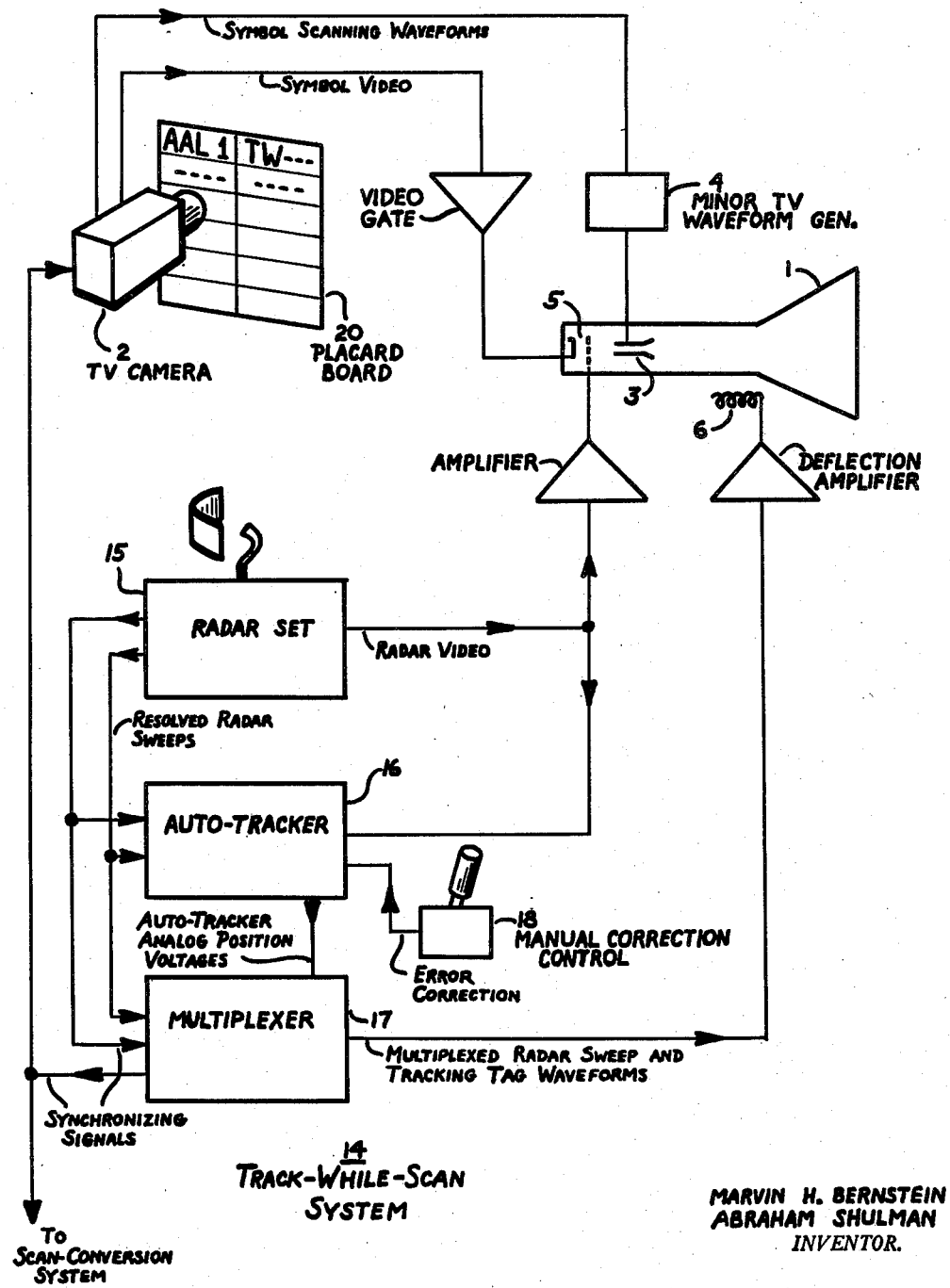
FIG. 1 shows one illustrative embodiment of the invention including a radar tracking system operated in conjunction with a symbol generating system.

In the embodiment of FIG. 1 a cathode ray tube 1 exhibits a PPI display, including tracking tags and symbolic information. The cathode ray tube is intensity modulated by symbol-video signals from the television camera 2. The camera is part of a closed-circuit TV subsystem employed for symbol generation. The intensity modulation takes place during the radar dead time, while the electron beam is deflected to the vicinity of the target to be identified.

At the same time minor TV scanning waveforms are applied to auxiliary electrostatic deflection plates 3, in the cathode ray tube, to display the symbol video. The waveforms are produced by a minor TV waveform generator 4, synchronized with the horizontal scan rate of the camera.

The auxiliary deflection plates lie in the neck of the cathode ray tube between the electron gun 5, and the magnetic deflection yoke 6. This arrangement has the advantage of permitting the rapid horizontal TV scanning waveforms, needed for symbol presentation, to be applied to a cathode ray tube that has a relatively slow magnetic deflection system.

Figure 3:
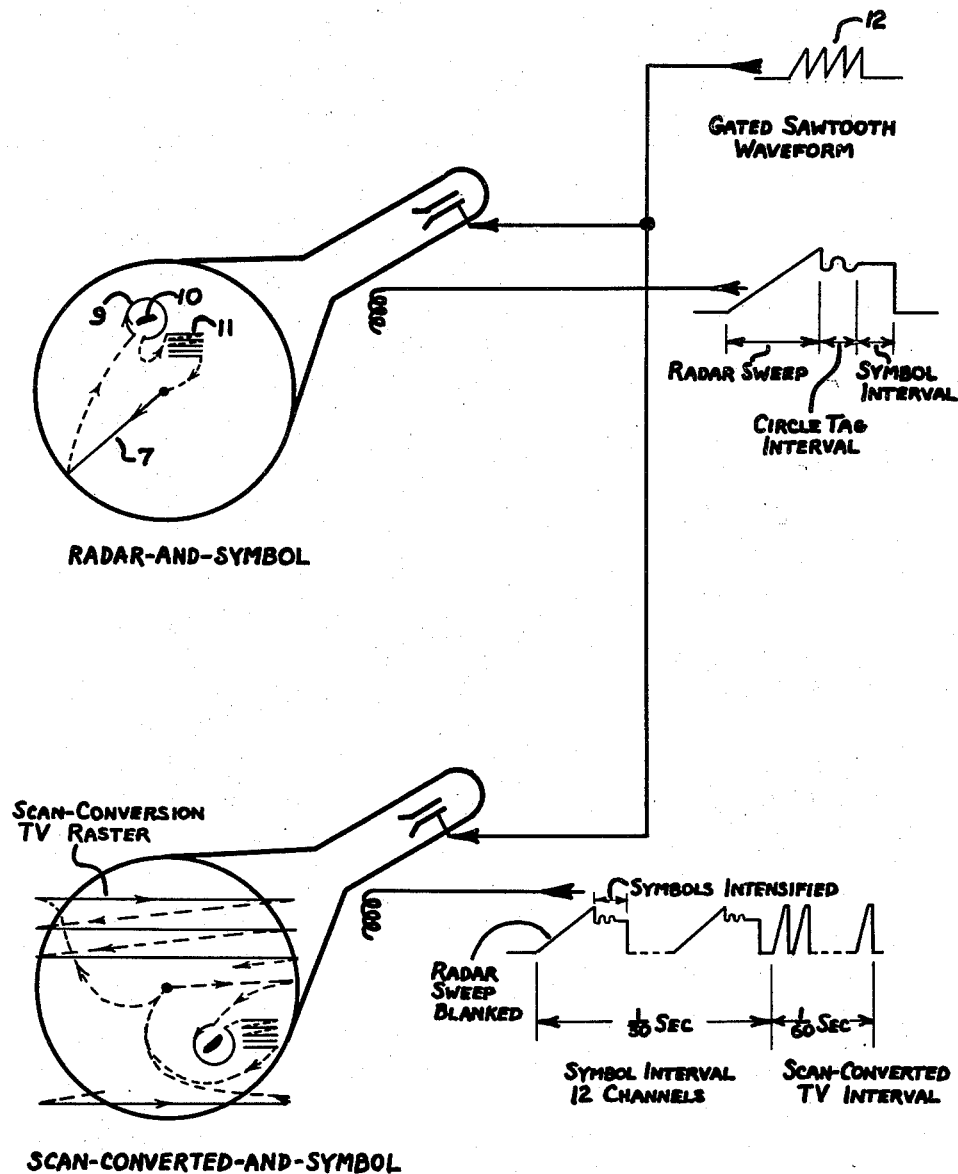
FIG. 3 illustrates the use of two different radar display techniques in conjunction with a symbolic presentation.

FIG. 3 shows the type of "radar-and-symbol" display produced by the system of FIG. 1. The system, in the form in which it was tested, employed an 80-mile PPI radar sweep 7 at a nominal repetition rate of 360 cycles per second. Circle-tag waveforms such as 8, in FIG. 3, applied during the radar dead time, generate a circular tag 9, also known as a tracking tag, surrounding the radar target 10, being tracked. Minor TV rasters 11 are produced by gated sawtooth waveforms 12 immediately following the circle-tag interval. Also, at this time, the symbol video signals are gated on to dipslay the symbols.

The sequence of a complete cycle in the "radar-and-symbol" display is as follows:

(1) The cathode ray tube beam is intensified as it sweeps linearly from screen center to periphery, making one 80-mile radar sweep.

(2) From the screen periphery, the beam slews rapidly to a target position without being intensified.

(3) The beam is intensified as it traces a small circle around the target. A small sector of circle may be blanked to show when the auto-tracking facility of the associated tracking channel is not used.

(4) After completing its circular motion, the beam traces out 15 lines of an interlaced 30-line minor TV raster while being intensified by symbol video.

(5) After tracing the 15th line, the beam slews rapidly back to screen center to await the next cycle.

(6) Twenty-four symbol-identified tracking tags are displayed successively, each at an independent position determined by a tracking channel.

The system of FIG. 1 employs a complete track-while-scan system 14, including a radar set 15, and twenty-four Cartesian analog precision auto-tracking channels 16. In the channels of this system, means are provided for maintaining accurate registration between a radar target and the associated tracking tag. The 24 channels of the system control 24 separate tracking tags, so that 24 distinct radar targets may be tracked simultaneously.

It is an important feature of such tracking systems that signals precisely representative of target position are made available by the tracking channels. Each autotracking channel stores—in analog form—the Cartesian resolved position of one radar target being tracked. The system includes a multiplexer 17, for precise multiplexing of the outputs of channel analog memory stores, and for interlacing these channel outputs with resolved radar sweep waveforms. The channel memory stores can also be corrected manually, by means of a manual correction control 18, for registration errors that are detected visually on the display.

By means of television camera 2, and a placard board 20, the symbols on the placards are presented on the display adjacent to the tracking tags. Sufficient time exists for such a presentation since the tag requires no more than 200 of the 1780 microseconds of radar dead time. In the remaining 1580 microseconds, the television camera scans through at least one twelfth of a vertical scan, sufficient to encompass the height of a placard. Consequently by applying to the display cathode ray tube, minor TV scanning waveforms corresponding to the scanning of one placard, the camera video derived from the placard can be displayed at the position of the tracking tag.

A notable feature of the system is the use of a symbol-generating system synchronized with the channel multiplexing rate, which is in turn synchronized with the radar system trigger, as indicated by the system synchronizing signals shown in FIG. 1. The effect of the synchronization is depicted in the scan-converted-and-symbol waveform of FIG. 3, which combines radar, scan-conversion, and symbol intervals. In this way, the symbols on a placard can be scanned by the TV camera at the same time that the tracking channel to which the symbols relate is sampled by the channel multiplexer.

The TV camera continuously scans the entire placard board in the conventional way, and a particular placard is chosen by selectively intensifying the synchronized scan at the cathode ray tube. This technique makes it possible to present the 24 different symbol formats in the camera picture at the independent locations of the 24 tracking tags on the radar-and-symbol display.

The system also is provided with a radar display wherein the PPI picture is scan-converted to a TV type of format before presentation on a display cathode ray tube. The scan-converted PPI picture is particularly advantageous in that the brightness of scan-converted radar targets is relatively constant and persistent. Symbols are added to this display in the same way as previously described herein, and the resulting presentation is referred to as the "scan-converted-and-symbol" display.

Figure 2:
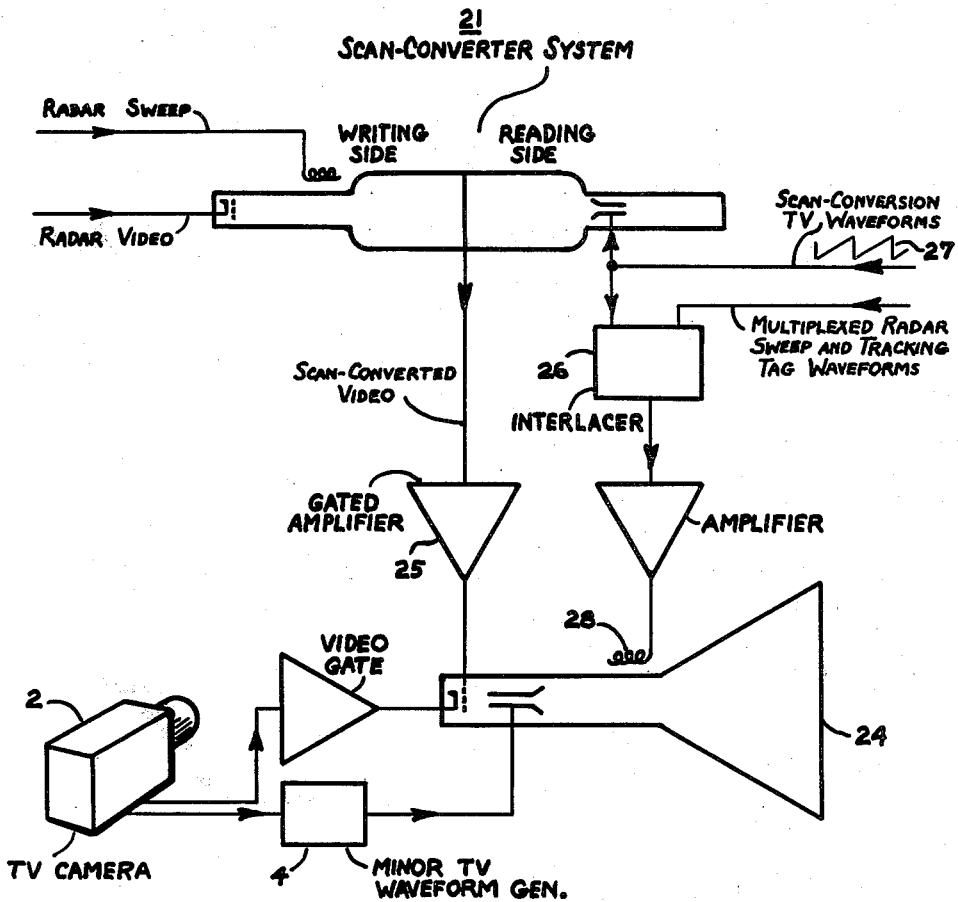
FIG. 2 illustrates an additional part of the system of FIG. 1, shown separately for simplicity, employing scan-conversion for display of radar signals.

The scan-conversion is based on a scan-converter system 21, of FIG. 2, which converts a PPI picture to TV in a 625-line interlaced frame. The heart of this system is a scan-converter tube 22, a storage tube that reads and writes simultaneously. The tube is shown with a writing beam impressing the radar PPI picture on one side of a target 23, while on the other side a TV-sweep-actuated reading beam generates read-out video signals. The video signals are applied to the cathode-ray-tube 24 by a gated amplifier 25, at the same time that an interlacer 26 is applying the scan-conversion TV waveforms 27 to the cathode ray tube magnetic deflection system 28. By these means a 312.5-line field of a televised PPI display is presented during a ⅟₆₀-second interval.

During the same interval, symbol video and symbol TV waveforms are gated off. The symbols are derived by the same means as previously described for the "radar-and-symbol" display. In the next ⅟₃₀ second, the scan-converted TV waveforms are gated off, while twelve multiplexed symbol-TV waveforms with their associated tags are presented successively near the scan-converted radar targets. The alternate 312.5-line scan-converted TV field is displayed during the next ⅟₆₀ second, after which the twelve remaining tracking tags, and symbol formats appear. In this way the system neglects two-thirds of the normal scan-converted TV fields in order to provide for the presentation of twenty-four tracking tags and symbol formats.

FIG. 3 illustrates the generation of the "scan-converted-and-symbol" display with a typical tracking tag and symbol pattern. The display cycle is as follows:

(1) The cathode ray tube beam slews rapidly from the lower right hand corner of the display to the screen center without being intensified.

(2) From screen center, the beam makes twelve successive radar sweeps in ⅟₃₀ of a second. Each sweep is exactly as in the radar-and-symbol display, except that the radar sweeps are not intensified. During this interval only tracking tags and symbol formats are displayed.

(3) Concluding the twelve radar sweeps, the beam slews rapidly to the upper left corner, and in the next ⅟₆₀ second makes one 312.5-line field of an interlaced 625-line frame that displays scan-converted radar video.

(4) The 312.5-line field ends at the lower right hand corner, where the cycle starts again, except that the remaining twelve tracking tags and the alternate TV field are then presented.

A preferred embodiment of the invention has been described to facilitate an understanding of the invention, but many variations will be apparent to those skilled in the art.

What is claimed is:

1. An air traffic control system comprising a radar set, including means for transmitting a radar signal and receiving radar echoes therefrom, means for displaying said radar echoes, and means for tracking selected radar targets, the said radar display means comprising, in combination, a PPI display of radar targets, scan-conversion means providing a scan-converted facsimile presentation of said PPI display, means for generating symbols, including televised symbols, relating to said radar targets, and means responsive to target position data from said radar tracking means for presenting said symbols adjacent to said related radar targets on said PPI display, and simultaneously in like manner on said scan-converted facsimile, the said symbol-generation and symbol-presentation means operating synchronously with, but otherwise independently of, the said scan-conversion means.

2. A radar display system comprising, in combination, a PPI display of radar targets, scan-conversion means providing a scan-converted facsimile presentation of said PPI display, means for generating symbols relating to said radar targets, and means for presenting said symbols adjacent to said related radar targets on said PPI display and simultaneously in like maner on said scan-converted facsimile, the said symbol-generation and symbol-presentation means operating synchronously with, but otherwise independently of, the said scan-conversion means.

References Cited by the Examiner

UNITED STATES PATENTS

| 2,701,352 | 2/55 | Kingdon et al. | 340—3 |
| 2,774,964 | 12/56 | Baker et al. | 343—6 |
| 2,849,707 | 8/58 | White | 343—7.3 |
| 2,858,531 | 10/58 | Stocker | 343—5 |
| 2,917,737 | 12/59 | Close et al. | 343—7.3 |
| 2,944,253 | 7/60 | Coverly et al. | 343—5 |

OTHER REFERENCES

"A Precision Interlaced Cathode-Ray-Tube Display," by A. Shulman, Proceedings of the National Electronics Conference, vol. XI, March 3, 1956. Pages 766–776 relied upon.

CHESTER L. JUSTUS, *Primary Examiner.*

MALCOLM A. MORRISON, *Examiner.*